United States Patent [19]
Kern

[11] Patent Number: 4,601,545
[45] Date of Patent: Jul. 22, 1986

[54] VARIABLE POWER LENS SYSTEM

[76] Inventor: Seymour P. Kern, 22 Timbergate, Irvine, Calif. 92714

[21] Appl. No.: 610,686

[22] Filed: May 16, 1984

[51] Int. Cl.⁴ ............................ G02F 1/13; A61F 1/16
[52] U.S. Cl. ............................ 350/347 V; 350/331 R; 350/332; 350/336; 623/4
[58] Field of Search ........... 350/331 R, 347 V, 347 R, 350/333, 336; 3/13 A

[56] References Cited

U.S. PATENT DOCUMENTS

| | | | |
|---|---|---|---|
| 4,010,496 | 3/1977 | Neefe | 3/13 |
| 4,373,218 | 2/1983 | Schachar | 3/13 |
| 4,385,805 | 5/1983 | Channin | 350/347 V X |
| 4,435,047 | 3/1984 | Fergason | 350/334 |

FOREIGN PATENT DOCUMENTS 2011640  7/1979  United Kingdom ........... 350/347 V

Primary Examiner—John K. Corbin
Assistant Examiner—Richard F. Gallivan
Attorney, Agent, or Firm—Leonard Tachner

[57] ABSTRACT

There has been provided a variable lens. In one form the lens power may be varied and in another the power may be selectively fixed in a carrier material. There are no moving mechanical parts but instead an optically active molecular material such as liquid crystals. In one embodiment, the lens and control means for varying the power of the lens are mounted on a common substrate. The lens may be a single optical element or a multi-element device such as a Fresnel lens. A variable gradient index of refraction is achievable by applying a controlled stimulus field to the lens. For example, a geometrically configured matrix of electrical voltages, each at a selected addressable location relative to the optically active material, provides the gradient in one embodiment. A thin film embodiment finds applications in magnifying glasses, cameras, telescopes, microscopes, as well as for intraocular and contact lenses for the human eye.

34 Claims, 16 Drawing Figures

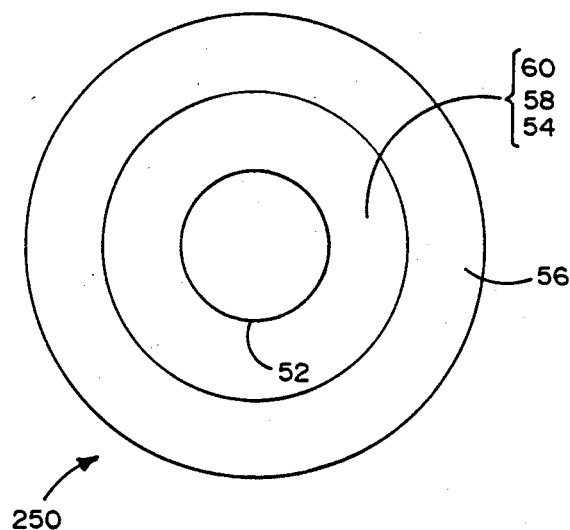
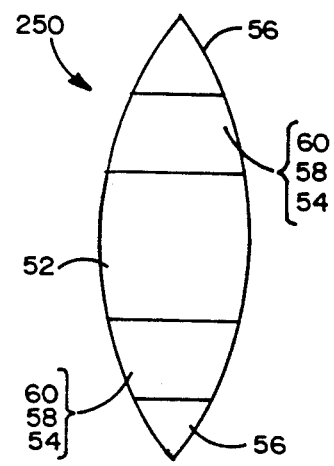
FIG. 6a    FIG. 6b
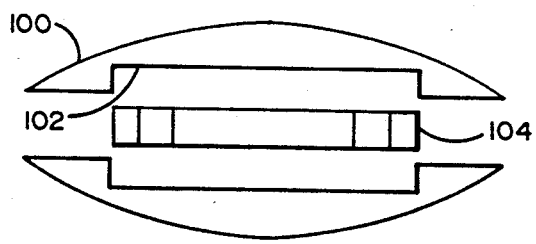
FIG. 6c
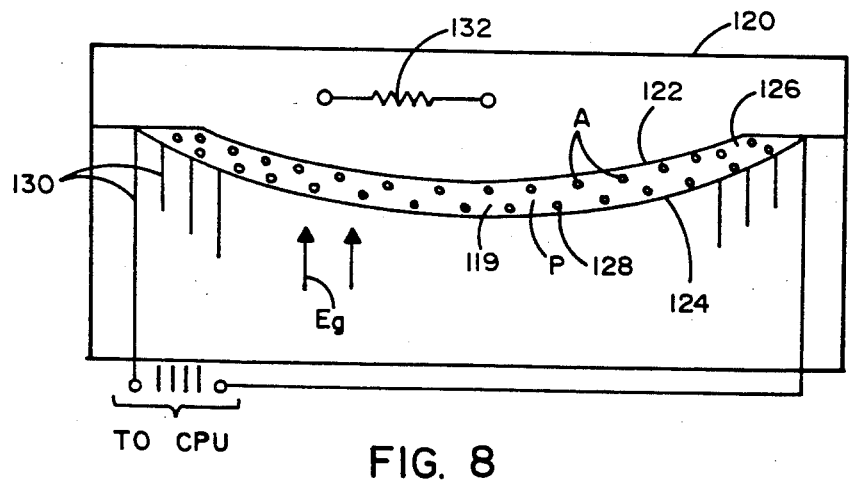
FIG. 8

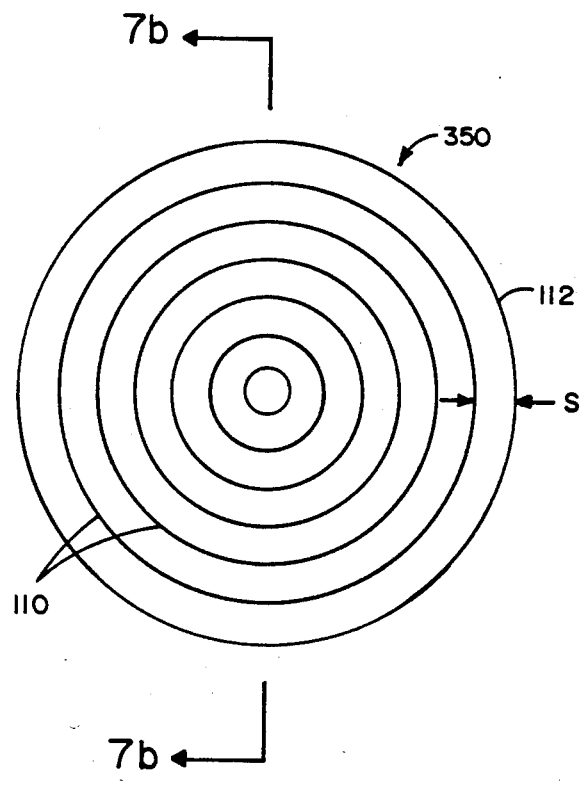
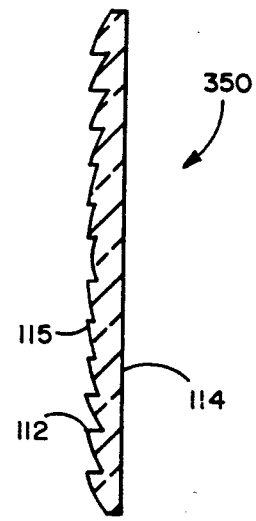
FIG. 7a  FIG. 7b
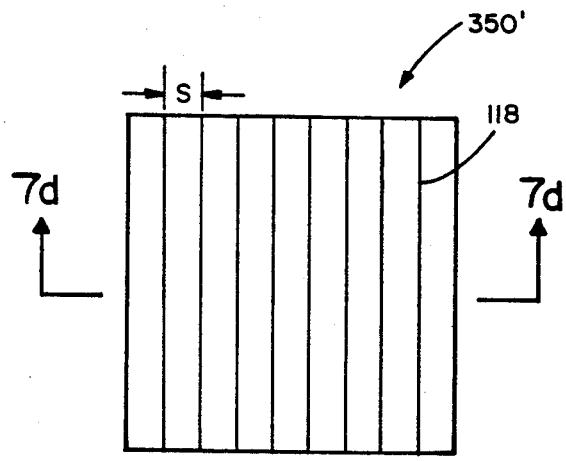
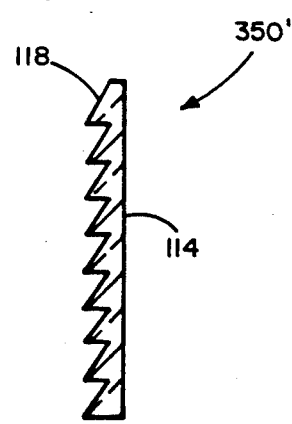
FIG. 7c  FIG. 7d

VARIABLE POWER LENS SYSTEM

BACKGROUND OF THE INVENTION

1. Field of the Invention

The invention relates to a lens system, and more particularly, to a variable or adjustable power lens device.

2. Prior Art

Variable focus lenses of various types are disclosed. For example, U.S. Pat. Nos. 4,373,218 and 4,190,330 disclose liquid crystal devices. In these prior art systems, the liquid crystal element is a relatively thick film, and thus requires relatively high activation power. U.S. Pat. No. 4,373,218 discloses a variable power intraocular lens formed of an expandable sack for implantation into the anterior chamber of a human eye. The lens may be a liquid crystal device controlled by a separate microprocessor. The liquid crystal material is contained within the expandable sock. U.S. Pat. No. 4,190,330 discloses the use of liquid crystal material in a complex dual lens configuration in which the focal length is varied by application of an electromagnetic field such as a magnetic field produced by an induction coil surrounding the entire lens structure. In U.S. Pat. Nos. 4,222,641; 4,016,094; and 3,499,112 various liquid crystal matrix devices are disclosed for color and light control. However, there is no system providing variable cylinder power and axis, prism power and axis, light and color in addition to sphere.

Other prior art of some relevance is disclosed in the following U.S. Pat. Nos.: 29,684, Gordon; 3,673,616, Fedorov et al; 3,974,331, Pepin; 3,976,874, Lange et al; 3,980,880, D'Agostino; 3,982,239, Sherr; 4,019,807, Boswell et al; 4,044,546, Koike; 4,050,814, McFadden; 4,143,265, Krappatsch; 4,239,345, Berreman et al; 4,241,339, Ushiyama; 4,272,910, Danz; 4,279,474, Belgorod; 4,300,818, Schachar; 4,332,039, LaFuente; 4,362,933, Kroener et al; 4,368,386, Huignard et al; 4,374,325, Howorth.

SUMMARY OF THE INVENTION

In one form, the present invention comprises a variable power lens having a thin film of optically active molecular material on a substrate, and means in operative relation to the material for producing a variable gradient index of refraction therein. In another embodiment, the invention comprises a multi-element, self-powered, variable lens. The present invention may be constructed so that the power requirement is small. Suitable power supplies for the invention include for example, a solar cell, a thermionic device, a low level nuclear power source, and a biological fuel cell. In miniaturized form, the invention is used as an intra-ocular or contact lens system in a human. The invention includes a lens in which the index of refraction is graded across the face and thereafter fixed at the value so established. In yet another embodiment, the lens is a flat structure of virtually any size, wherein a refractive index gradient creates a substantial change in lens power.

OBJECTS OF THE INVENTION

It is therefore a principal object of the present invention to provide an adjustable power lens system of thin film construction utilizing an optically active molecular material such as liquid crystals.

Is is another object of the invention to provide an adjustable power lens system having an optically active molecular material on a substrate and means in operative relation to the material for producing a variable gradient index of refraction.

It is still another object of the invention to provide a multi-element variable lens using optically active molecular material.

It is still another object of the invention to provide a variable power lens comprising an optically active lens element responsive to an eletric potential for changing the lens power, means for controlling the electrical potential applied to the lens element and a source of electrical potential, wherein at least the lens element and control means are contained on a common substrate.

It is still another object of the invention to provide a variable power lens comprising an optically active lens element responsive to a plurality of applied electrical potentials configured in the form of addressable matrix locations for providing a gradient in the refractive index of the lens element.

It is still an additional object of the invention to provide a variable power, multi-element lens such as a Fresnel lens in which each element thereof comprises a controlled liquid optical element that is adapted for addressable control by a respective electrode of a plurality of electrodes to which selectable electrical voltages are applied.

It is still an additional object of the present invention to provide a contact lens to be placed upon the cornea of the human eye, the ophthalmic correction provided by such a lens being established by the application of selectable voltages to liquid crystal material contained in the lens.

It is still an additional object of the present invention to provide a moldable variable power lens in which an optically active, curable material is subjected to a selected electromagnetic field for selection of lens parameters before being cured into a permanent lens configuration.

BRIEF DESCRIPTION OF THE DRAWINGS

The aforementioned objects and advantages of the present invention, as well as additional objects and advantages thereof will be more fully understood hereinafter as a result of detailed descriptions of various embodiments, when taken in conjunction with the accompanying drawings in which:

FIGS. 6a–6c show embodiments of the present invention in the form of an intraocular lens;

FIGS. 7a–7d are schematic representations of fresnel lens elements which may be utilized in the present invention; and FIG. 8 is a schematic representation of a method and apparatus for fabricating a fixed value gradient index lens.

The above schematic representations include materials of various thicknesses and sizes which have been exaggerated for purposes of illustration. It should also be understood that, in a preferred embodiment, the variable power lens of the present invention shall have been appropriately sized.

DESCRIPTION OF THE INVENTION

Figure 1:
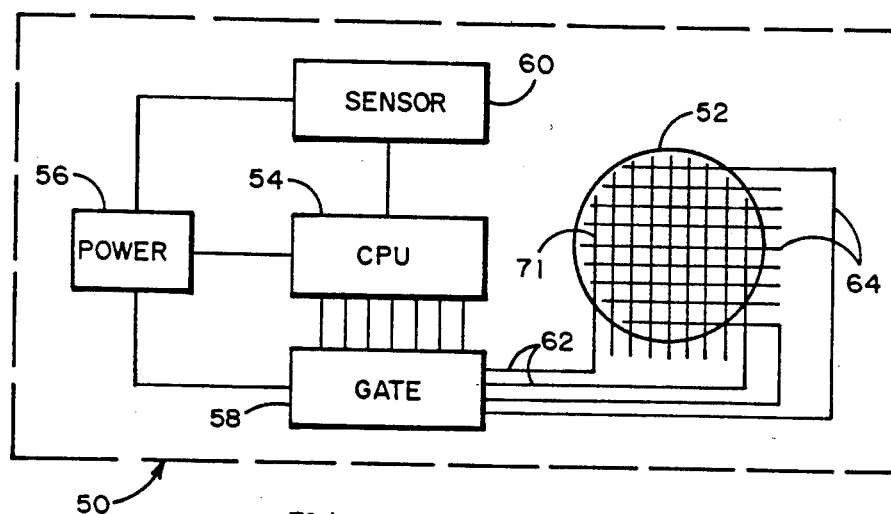
FIG. 1 is a schematic block diagram of one embodiment of the present invention and control therefor.

Referring first to FIG. 1, it will be seen that in one embodiment of the present invention, a variable lens system, represented by the reference numeral 50, comprises a variable power optically active lens 52, a microprocessor or central processing unit (CPU) 54, a power supply 56, a grating means or a gate 58, and a sensor 60. The CPU 54 may be an integrated circuit or micro-chip deposited on an organic or inorganic substrate. If used in the human body, the device should be enclosed in a biologically inert package. The CPU 54 comprises circuit means for generating a series of commands for controlling the lens 52. CPU 54 includes either fixed ROM or rewriteable RAM memory to store instructions regarding distribution of voltage levels described below. Instructions from the CPU 54 are coupled to gate 58, which controls electrode arrays or inputs 62 and 64 to apply an electric field to the lens 52. A conductor matrix 71, coupled to the electrode arrays 62 and 64, responsive to the CPU 54 via gate 58, produces a controlled electric field gradient in lens 54, as hereinafter described. The power supply 56 is appropriately coupled to the gate 58. Upon instruction from CPU 54, the gate 58 delivers or controls power to matrix 71 via the arrays 62 and 64. The gate 58 may include active elements incorporated or integrated with the arrays 62 and 64 and the matrix 71. Sensor 60 provides information to the CPU 54 for varying the power, axis, color correction, and/or light intensity entering the lens 52. An electromagnetic responsive optically active material 72 is located in operative relation to matrix 71. The material 72 may be a nematic, cholesteric or smectic liquid crystal material or combination thereof, a charge coupled device or other electrical, chemical or optically active material. Electrode matrix control of liquid crystal for displays is disclosed in U.S. Pat. Nos. 3,982,239; 4,016,094; and 4,050,814.

Figure 2:
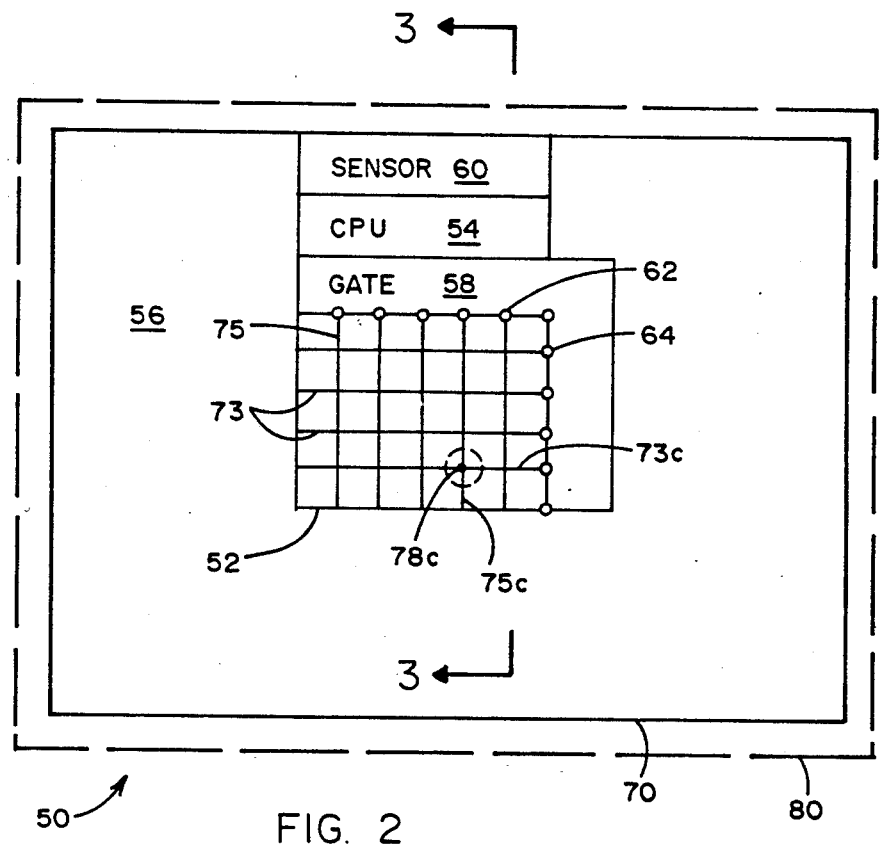
FIG. 2 is a schematic representation of the embodiment described in FIG. 1 as an integral device.

In FIG. 2, the system 50 of FIG. 1 is illustrated in integrated circuit form. If desired, certain components may be remotely located from others. Corresponding components from FIG. 1 carry the same reference numerals.

The system 50 comprises substrate 70 upon which is deposited microprocessor 54, power supply 56, gate 58, and sensor 60. The substrate 70 should be transparent at least in the area of lens 52. Array 62 and 64 and matrix 71 may be deposited on the substrate 70 in various forms including a grid matrix of respective horizontal and vertical transparent conductors 73 and 75 as shown. Electrically, chemically, or optically active material 72 (e.g. liquid crystal material) is located in the lens area 52 in operative relation to the matrix 71 whereby the electric field produced thereby influences the material 72.

Figure 3:
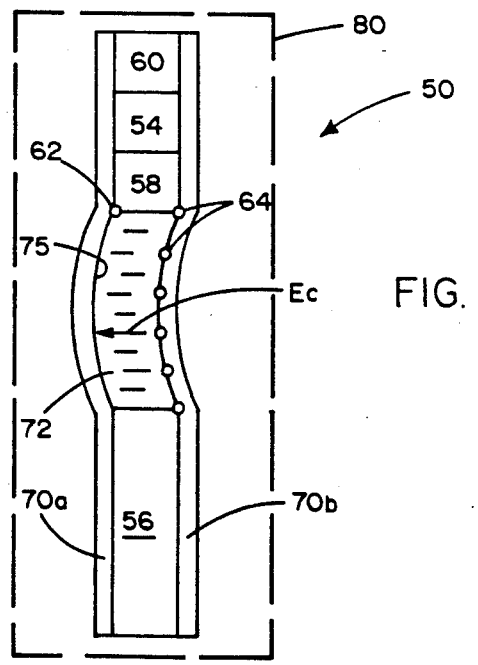
FIG. 3 is a side sectional representation of the device shown in FIG. 2 taken along lines 3—3 thereof.

Referring to FIG. 3, it is seen that the substrate 70 comprises a pair of opposed transparent plates 70a and 70b. These plates may be manufactured of microsheet glass, ceramic, glass-ceramic, resin, silicon, silicone, acrylic, or other suitable material or combination thereof. The CPU 54, power supply 56, gate 58, and sensor 60 may be deposited by known methods onto one or both of the sheets 70a and 70b. As shown further in FIG. 3, the input arrays 62 and 64 and conductors 73 and 75 are deposited on the opposed interior faces of the sheets 70a and 70b. A chamber 76 is provided wherein there may be incorporated the electrically, chemically or optically active material 72 (sometimes hereinafter active material 72). If a liquid crystal is used as the active material 72, an alignment layer (not shown) of a known type is provided on the substrate 70a and 70b in a well-known manner.

In at least one embodiment of the present invention, application of voltage across the active material 72 causes its index of refraction to change. The voltage applied across the active material 72 may be variable and selectively placed and the optical response of the active material 72 is variable in accordance with the voltage applied. The grid matrix 71 of respective horizontal and vertical conductors 73 and 75 allows the electrostatic field produced by the applied voltage to be selectively controlled at discrete points so that a gradient index of refraction, varying across the face thereof, is produced. Those having skill in the optics art will understand that the gradient in refractive index results in a device which selectively bends light as a function of position across the lens.

The CPU 54 selectively energizes one or more of the respective horizontal and vertical inputs 62 and 64 via the gate 58. The respective conductors 73 and 75 are separated by a finite distance d of about 1 to 100 microns as illustrated in FIG. 3. The space between the electrodes is small thereby minimizing response time and power requirements. In the projection of FIG. 2, the conductors 73 and 75 appear to intersect at cross points, e.g. 78. If, for example, an electrical signal is selectively impressed upon the vertical electrode 75c and horizontal electrode 73c, an electrostatic Ec field is created therebetween at the cross point, 78c. The field Ec creates a change in the molecular arrangement of the active material 72 causing it to alter its refractive index in accordance with the magnitude of the applied voltage. Each of the cross points 78 in the lens 52 may be accordingly addressed and energized such that a voltage gradient appears across the lens 52, and thus, the power of the lens may be finely controlled. The electrodes 73 and 75 are preferably transparent conductors, for example, indium oxide or tin oxide films. Other matrix arrangements in which, for example, conductors 73 and 75 are on the same side of the active material 72 and a common or ground plane is on the opposite side of material 72, are also contemplated.

If the active material 72 is a thin film, it is possible to create a relatively large and fast index change with considerably less power than with more complex devices such as liquid crystal twist cells. Also, the electrode matrix configuration hereinbefore described, provides optical leverage because differences in index create the lens effect in the same manner as lens curvature.

If the response time is sufficiently reduced, the device may be operated as an electronic camera shutter. In a multielement device, hereinafter described, the lens and shutter have no moving parts.

The system 50 may be a totally integrated device including charge coupled components to provide lens power. Also, the system may be hybrid formed such that the surfaces of the plates 70a and 70b have curvature as shown. Likewise, the plates 70a and 70b may be curved and parallel as in an ophthalmic lens. At any rate, a close approximation of the desired focal length of the lens system 50 may be provided by manipulation of the surfaces of the substrate 70. Accordingly, where a narrow range of powers is needed, only a minor change is necessary in order to correct for the various anticipated focal positions.

The system 50 may be encapsulated in suitable materials 80 such as materials selected from the group consisting of silicones, polymethacrylate, styrine, proline, ceramic, glass, nylon and mylar.

For certain applications, the materials should hermetically seal the system 50 and prevent deterioration of the materials therewithin. In addition, when used in a bionic device, the encapsulating materials 80 should be bio-compatible or inert substances.

Figure 4:
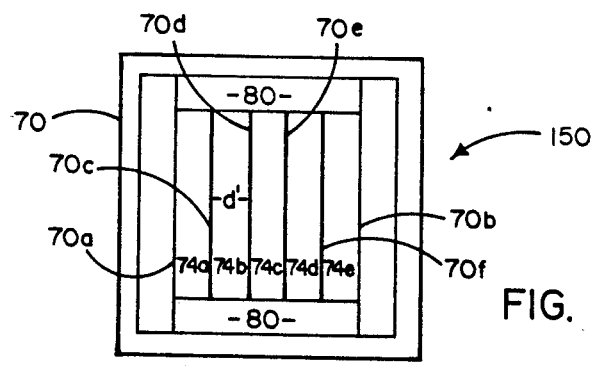
FIG. 4 is a schematic representation of a device similar to that shown in FIGS. 2 and 3 with multiple elements.

In FIG. 4, an alternate embodiment 150 of the invention is disclosed. Substrate 70 includes front and rear microsheets 70a and 70b and intermediate sheets 70c, 70d, 70e and 70f. The sheets are each separated by a finite distance d' of about 1–50 microns, as shown, to allow for the formation of a film of optically active material 72 in the respective spaces or chambers 74a–74e. In accordance with the principle of the present invention, the aforementioned power supply 56, CPU 54, and gate 58, sensor 60, and other elements such as a radio receiver may be deposited on the substrate 70 in the blocks labeled by reference numeral 80.

It should be understood that appropriate integrated circuit techniques may be utilized for producing the microprocessor 54 and power supply 56, etc. In the embodiment shown in FIG. 4, the system 150 may include a single optical element liquid crystal device in the chamber 74a, a multi-element device in chamber 74b and shutter in chamber 74c. In addition, although five chambers 74a–7e are shown, additional chambers may be added. Further, one chamber may be multiplexed for a variety of functions, and the surfaces and chambers may be curved instead of straight as shown in FIG. 4.

Figure 5A:
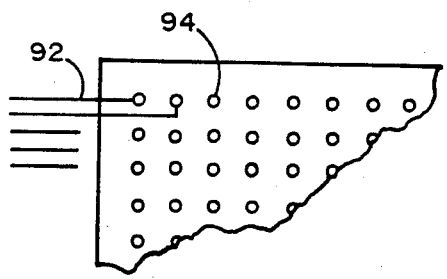
FIGS. 5a–5d are schematic representations of various electrode arrangements of the present invention.
Figure 5B:
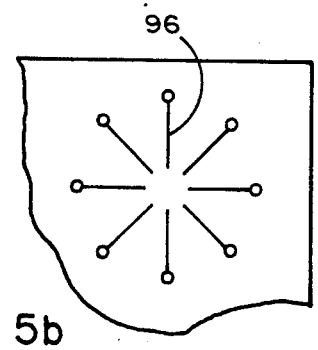
Figure 5C:
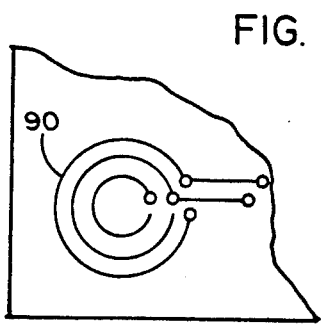
Figure 5D:
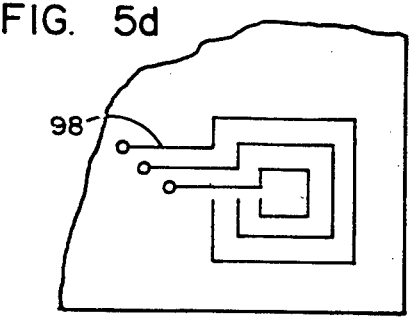

In operation, the magnification of an image changes with the applied electrical field gradient across the lens. Variation in the refractive index gradient of the material changes the power of the lens. Various electrode arrangements, as illustrated in FIGS. 5a–5d, may be provided in order to create different optical effects. For example, electrodes may be alternately powered concentric electrodes 90 on a single substrate for creating a cylindrical lens effect (FIG. 5c). Similarly, various combinations may be provided for creating a most useful aspheric lens effect. The electrodes may be in the form of a dot matrix of opposed transparent electrodes 92 with individually addressable dots 94 on one or both surfaces, FIG. 5a; conductive radial lines 96 emanating from, or to, a central point, FIG. 5b; or concentric squares 98 and the like, FIG. 5d.

In the embodiment shown in FIGS. 6a–6b a system 250 may be miniaturized for use as an intraocular or contact lens. For example, the entire structure may be 5–7 millimeters in diameter overall. The lens portion 52 may be some fraction of the same, for example 2.5–5 millimeters in diameter. The remaining area may be devoted to the CPU 54, the gate 58, the sensor 60 and the power supply 56. It is estimated that the amount of area required for the CPU 54, the gate 58, and the sensor 60 is approximately 30 to 40% of the total area. Thus, a substantial portion of the system 250 is available for a radioactive electrical ion generator, a photoelectric or solar cell, a thermionic device or the like.

In the embodiment of the present invention as an intraocular lens, it is intended that the system 250 operate for long periods of time (e.g. 50 years). The voltage required to create a suitable electric field should be in the order of 0.1 to 20 volts. It is possible to create a power supply 56 utilizing a low level nuclear source such as strontium 90, which can operate for as long as for 50 years and produce a uniform and reliable power source in the order of 1–100 nanowatts. Such voltages are believed capable of producing a lens power gradient across the lens in the range of −20 and +20 diopters which is sufficient for most corrections. The entire range can be achieved in multi-element lens configurations such as Fresnel lenses.

If a photoelectric device is utilized, the period of operation may also be measured in years because the photoelectric device receives energy from the ambient light and converts the same into usable electric power. Because by definition, the system 250 looks for light as the image, the same light produces sufficient photo energy to maintain the power supply 56 operative for driving itself. In the embodiment of the present invention as a contact lens, a rechargeable power supply may be provided.

In the embodiment of FIGS. 6a and 6b, an antenna may be provided for radio or wireless control, and a radio receiver (not shown) may be incorporated into the integrated structure of the CPU 54, gate 58 and sensor 60. The antenna may be part of the lens supporting structure such as around the periphery of the lens.

In an alternative contact lens configuration, a conventional lens structure 100 is provided with an accessible compartment designed to accommodate a thin film optically active integrated lens structure 104 of the type illustrated in FIGS. 1 and 2.

The lens surface may be formed with fresnel shapes, which are particularly useful with liquid crystal optically active molecular materials. For example, in FIGS. 7a and 7b front and side sectional elevations of a circular fresnel lens 350 are shown. Concentric ring fresnel surfaces 112 are separated by a spacing S. Active material 72 may be deposited on one or both sufaces 114 and 115 of the lens 350. The spacing S of the fresnel surfaces 112 may be as close as possible to the wavelength of the light without creating significant distortion. In FIGS. 7c and 7d a fresnel lens 350' having parallel fresnel surfaces 118 is illustrated. The fresnel surfaces are formed of electrically conductive material. Each such surface is separately addressable for controlling the lens. There may also be an electrode on surface 114 opposite fresnel surfaces 112 and 118 for gross lens control. Furthermore, the lens itself may be conventional but have adjacent one or both of its surfaces, a contiguous layer of optically active material for varying lens power.

Another embodiment of the invention is schematically illustrated in FIG. 8. A moldable material 119 is deposited in a mold including opposed mold surfaces 122 and 124 forming mold cavity 126. The material 119 may be in the form of an organic polymer P mixed with optically active material A. The mixture is deposited in the mold 120. Electrodes 130 are in operative communication with the material 119 in the mold cavity 126. The electrodes 130 may be coupled to a CPU (not shown in FIG. 8), which may address electrodes 130 and create a gradient electric field Eg within the mold 120. In one embodiment of the moldable material 119 is porous, for example, a hydrophilic contact lens material, for receiving optically active material therein. The material 119 is injected into mold 120. The electric field Eg is applied over electrodes 130 to establish a gradient refractive index in the mold material 119. Thereafter the material is either heat cured by a resistive heater 132, chemically cured or simply allowed to set depending upon the selected material 119.

In another embodiment, hydrophilic contact lens blank is impregnated with a liquid crystal material and placed in operative relation with the electrodes 130. The liquid crystal is thus oriented in accordance with the field and a lens power established. It may also be possible to deposit the mold material directly in the eye as a liquid film, and apply a low power electric field directly to the film to produce a contact lens which may be worn for an indefinite period and disposed of.

It is intended that the components be made as light weight as possible. For example, the envelope or structural components described herein may be formed of various organic or inorganic materials including gels. Such materials may be hermetically sealed, depending on their intended use.

In yet another embodiment, the present invention may include a wireless receiver for receiving control signals from a remote control device. Such a system may provide a miniaturized interactive game or display device, and may be in the form of a non-invasive or temporarily inserted device, e.g., a contact-like lens.

It will now be understood that the present invention comprises an adjustable power lens system having an optically active molecular material. Various novel embodiments have been disclosed that exhibit features not shown in the prior art. Thin film construction, integrated lens and control, multi-element configuration, gradient inducing addressable control signal matrices, contact lens configurations, curable material fabrication, multiple element complex lens and shutter combinations and variable cylinder power and axis, prism power and axis, light and color in addition to sphere.

Those having ordinary skill in the relevant arts will now apprehend various modifications and/or additions to the invention herein disclosed. By way of example, other lens configurations and control schemes, as well as other optically active materials will, as a result of the teaching herein, now come to mind. However, such modifications and additions are contemplated as being within the scope of the invention which is limited only by the claims appended hereto.

I claim:
1. A variable lens comprising:
a variable power optical device including an optically active lens responsive to an energy stimulus for changing the power of the lens;
control means for controlling the energy stimulus;
a source of energy for generating the energy stimulus for driving the control means and the lens;
a substrate for housing the lens, control means and energy source, each integrally deposited on the substrate.
2. The lens as set forth in claim 1 wherein the energy stimulus is an electrical field and further including a plurality of transparent grid electrodes deposited on the substrate and responsively coupled to the control means, said electrodes forming a matrix of addressable locations for producing a gradient electric field of electric potential across said lens, whereby a gradient in the refractive power of said lens is produced.
3. The lens of claim 2 wherein said electrodes are formed of opposed spaced grid electrodes, intersecting in projection, for producing the addressable locations.
4. The lens of claim 2 wherein said substrate comprises at least two opposed plates of glass microsheet having at least one of said spaced electrodes deposited on each of opposed adjacent faces of the plates, and said control means and power source being deposited on at least one of said plates.
5. The lens of claim 2 wherein said control means comprises a microprocessor and further including a set of gates deposited on said substrate, said gates coupled to said microprocessor, power source and electrodes for gating power from said power source to said electrodes in accordance with selected output of said microprocessor.
6. The lens of claim 2 wherein said electrodes are spaced up to about 100 microns apart.
7. The lens of claim 2 wherein the electrode is a transparent conductive material selected from the group consisting of indium oxide and tin oxide.
8. The lens of claim 1 wherein said lens system is hermetically sealed within an encapsulating material.
9. The lens of claim 8 wherein said encapsulating material is bio-compatible inert material.
10. The lens of claim 1 wherein the lens further includes one of a light diode and color correcting cell.
11. The lens of claim 1 wherein said lens includes at least one of a nematic and cholesteric liquid crystal material therein.
12. The lens of claim 1 wherein the optically active material is a thin film layer of said material of about 5 to 100 microns thick.
13. The lens of claim 1 wherein the energy supply is capable of generating the energy required to drive the system for a period of years.
14. The lens of claim 1 being sized for insertion into the eye of a human.
15. The lens of claim 1 wherein said lens is capable of varying its power from about +20 diopters to about −20 diopters and the control means requires as little as about 1 to about 100 nanoAmps of current.
16. The variable lens recited in claim 1 wherein said energy stimulus is at least one of the following: electric field, magnetic field, electromagnetic field, light field, sonic field, radiation field.
17. A lens system comprising: a plurality of closely spaced electrodes having addressable pairs of discrete locations, means for addressably impressing on each said electrode pair electric energy of a selected amount thereby producing different electrical fields at different electrode pair locations, optically active material located in intimate relation with the electrodes and being responsive to the electric fields for producing a corresponding index of refraction in the active material at each respective location, and optically active material being configured in a relatively thin film of up to about 100 microns in thickness between said electrodes to thereby minimize the power necessary to drive the active material to the various indices of refraction, the different indices of refraction creating a gradient index of refraction across said system, the electrodes being in the form of a matrix of addressable dots.
18. A lens system comprising: a plurality of closely spaced electrodes having addressable pairs at discrete locations, means for addressably impressing on each said electrode pair electric energy of a selected amount thereby producing different electrical fields at different electrode pair locations, optically active material located in intimate relation with the electrodes and being responsive to the electric fields for producing a corresponding index of refraction in the active material at each respective location, said optically active material being configured in a relatively thin film of up to about 100 microns in thickness between said electrodes to thereby minimize the power necessary to drive the active material to the various indices of refraction, the different indices of refraction creating a gradient index of refraction across said system, a substrate material for supporting the electrodes, said substrate material having at least one of a curved surface, prismatic surface, and fresnel surface.

19. The lens of claim 18 wherein said substrate material is a gel.

20. The lens of claim 18 wherein said substrate material is selected from the group of materials consisting of glass, glass-ceramic silicone, silicon resin, acrylic nylon, plastic, styrene, methyl methacrylates, cellulose acetates and gas permeable substances.

21. The lens of claim 18 wherein said electrodes are in the form of at least one of concentric lines and a linear array.

22. The lens of claim 18 wherein said substrate material includes an alignment layer.

23. The lens of claim 18 wherein the means of addressably impressing the electric fields comprises a microprocessor having means for storing, accessing and displaying information in the form of visual indicia in said lens and memory means for controlling said microprocessor.

24. The lens of claim 23 wherein control means includes means for establishing wireless communication between said matrix and said microprocessor.

25. The lens of claim 23 wherein the control means is remote from the microprocessor and the lens system includes an antenna and receiver responsively coupled to the memory means.

26. The lens of claim 18 wherein said optically active material is varied for producing at least one of sphere, cylinder, prism and axis variations therein.

27. A light transmission device comprising: a carrier mixed with an electrically and optically active material, said device at least momentarily operatively coupled to a matrix of programmable electrodes, said electrodes being programmed to produce a gradient electric field across said matrix.

28. The device of claim 27 wherein the carrier is a curable liquid polymer.

29. The device of claim 27 wherein the carrier is a hydrophilic contact lens blank.

30. A variable lens comprising: a fresnel surface having a selected optical power; an energy stimulus responsive optically active material deposited in optical relation with the fresnel surface for varying said optical power in response to an energy stimulus input; and control means for generating said energy stimulus input; wherein said fresnel surface comprises a plurality of optical elements formed of separately addressable electrodes, each of said electrodes coupled to the control means.

31. The lens of claim 30 wherein said optically active material is a relatively thin film of liquid crystal of up to about 100 microns thick.

32. The lens of claim 30 wherein said energy stimulus is at least one of the following: electric field, magnetic field, electromagnetic field, light field, sonic field, radiation field.

33. A variable power Fresnel lens comprising:
a plurality of optically active lens elements arranged in a Fresnel lens pattern and responsive to a source of energy stimulus for changing the index of refraction over the lens surface, a source of energy stimulus and means for applying said energy stimulus to said lens elements in a controlled manner for selecting the optical power of said lens.

34. The lens recited in claim 33 wherein said energy stimulus is at least one of the following: electric field, magnetic field, electromagnetic field, light field, sonic field, radiation field.

* * * * *